(12) United States Patent
Padhi et al.

(10) Patent No.: US 6,207,129 B1
(45) Date of Patent: *Mar. 27, 2001

(54) LITHIATED MANGANESE OXIDE

(75) Inventors: Akshaya Kumar Padhi; Chithambarathanu Pillai, both of LaSalle, IL (US)

(73) Assignee: Carus Corporation, Peru, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/312,033

(22) Filed: May 14, 1999

Related U.S. Application Data

(63) Continuation-in-part of application No. 09/082,329, filed on May 21, 1998, now Pat. No. 5,955,052.

(51) Int. Cl.$^7$ .................................................. C01G 45/12
(52) U.S. Cl. ....................... 423/599; 423/179.5; 423/181; 423/605; 423/641; 429/224; 429/231.95
(58) Field of Search ........................... 423/599, 605, 423/641, 179.5, 181; 429/224, 231.95

(56) References Cited

U.S. PATENT DOCUMENTS

| 4,246,253 | 1/1981 | Hunter | 423/605 |
| 4,312,930 | 1/1982 | Hunter | 429/191 |

(List continued on next page.)

FOREIGN PATENT DOCUMENTS

| 279235 | 8/1988 | (EP) . |
| 2659075 | 9/1991 | (FR) . |
| 2221213 | 1/1990 | (GB) . |
| WO 97/26683 | 7/1997 | (WO) . |
| WO 98/14403 | 4/1998 | (WO) . |

OTHER PUBLICATIONS

Chen et al., "Cathodic Behavior of Alkali Manganese Oxides from Permanganate," J. Electrochem. Soc., vol. 144, No. 4, Apr. 1997.

d'Yviore et al., "Phase Transitions and Ionic Conduction in 3D Skeleton Phosphates," Solid State Ionics 9 & 10 (1983) 851–858.

Goodenough et al., "Lithium Insertion/Extraction Reactions with Manganese Oxides," Rev. Chim. Miner., 21, 435 (1984).

Guyomard et al., "Li Metal–Free Rechargeable LiMn$_2$O$_4$/ Carbon Cells: Their Understanding and Optimization," J. Electrochem. Soc., vol. 139, No. 4, Apr. 1992.

Masquelier et al., "Chemical and Magnetic Characterization of Spinel Materials in the LiMn$_2$O$_4$–Li$_2$Mn$_4$O$_9$–Li$_4$Mn$_5$O$_{12}$ System," J. Solid State Chem. 123, 255–266 (1996).

(List continued on next page.)

Primary Examiner—Tom Dunn
Assistant Examiner—Cam N. Nguyen
(74) Attorney, Agent, or Firm—Fitch, Even, Tabin & Flannery

(57) ABSTRACT

The invention is a process which provides a high purity lithiated manganese oxide ($Li_{1+x}Mn_{2-y}O_4$) from chemically made $MnO_2$. The lithiated manganese oxide has an especially effective utility for use as a cathodic material in rechargeable batteries. The process of the invention includes blending a lithium compound with a chemically made manganese dioxide to form a manganese dioxide/lithium compound blend. The lithium compound in the blend is at least about one mole of lithium for every mole of manganese dioxide. The manganese dioxide and lithium compound in the blend undergo an ion exchange reaction to provide an ion replaced product where lithium ions have replaced sodium and potassium ions in the $MnO_2$ to form an ion replaced product. Thereafter, the ion replaced product is heated or calcined to provide the lithiated manganese oxide.

53 Claims, 2 Drawing Sheets

U.S. PATENT DOCUMENTS

| | | | |
|---|---|---|---|
| 4,590,059 | 5/1986 | Mellors | 423/605 |
| 4,975,346 | 12/1990 | Lecerf et al. | 429/197 |
| 4,980,251 | 12/1990 | Thackeray et al. | 429/224 |
| 5,135,732 | 8/1992 | Barboux et al. | 423/593 |
| 5,153,081 | 10/1992 | Thackeray et al. | 429/194 |
| 5,211,933 | 5/1993 | Barboux et al. | 423/596 |
| 5,478,672 | 12/1995 | Mitate | 429/194 |
| 5,506,077 * | 4/1996 | Koksbang | 429/224 |
| 5,558,961 | 9/1996 | Doeff et al. | 429/224 |
| 5,561,006 | 10/1996 | Lecerf et al. | 429/218 |
| 5,604,057 | 2/1997 | Nazri | 429/224 |
| 5,605,773 | 2/1997 | Ellgen | 429/194 |
| 5,702,679 | 12/1997 | Sheargold et al. | 423/599 |
| 5,753,202 | 5/1998 | Wang et al. | 423/599 |
| 5,759,510 | 6/1998 | Pillai | 423/599 |
| 5,766,569 | 6/1998 | Ellgen et al. | 423/599 |
| 5,770,018 * | 6/1998 | Saidi | 204/157.15 |
| 5,824,285 * | 10/1998 | Koksbang | 423/599 |
| 5,976,489 * | 11/1999 | Saidi et al. | 423/599 |
| 5,997,839 * | 12/1999 | Pillai | 423/599 |
| 6,048,645 * | 4/2000 | Saidi et al. | 429/231.95 |

OTHER PUBLICATIONS

Mizushima et al., "A New Cathode Material for Batteries of High Energy Density," Mat. Res. Bull., vol. 15, 783 (1980).

Nalbandyan et al., "New Modification of Lithium Monoferrite and the Morphotropic Series $AFeO_2$," Russian J. Of Inorganic Chem, 32(3), 1987.

Ohzuku et al., "Electrochemistry of Manganese Dioxide in Lithium Non–aqueous Cell," J. Electrochem. Soc., vol. 137, No. 3, Mar. 1990.

Tarascon et al., "The $Li_{1+x}Mn_2O_4$/C Rocking–Chair System: A Review," Electrochimica Acta., vol. 38, No. 9, pp. 1221–1231, 1993.

Tarascon et al., "The Spinel Phase of $LiMn_2O_4$ as a Cathode in Secondary Lithium Cells," Electrochem. Soc., vol. 138, No. 10, Oct. 1991.

Thackeray et al., "Structural Characterization of the Lithiated Iron Oxides $Li_xFe_3O_4$ and $Li_xFe_2O_3$ (0<x<2)," Mat. Res. Bull., vol. 17, pp. 785–793 (1982).

Thackeray, "Structural Considerations of Layered and Spinel Lithiated Oxides for Lithium Ion Batteries," J. Electrochem. Soc., vol. 142, No. 8, Aug. 1995.

Thomas et al., "Synthesis and Structural Characterization of the Normal Spinel $Li[Ni_2]O_4$," Mat. Res. Bull., vol. 20, pp. 1137–1146, (1985).

Tsang et al., "A New Route for the Synthesis of $LiMN_2O_4$ Cathode: Variation of Composition, Microstructure, and Electrochemical Behavior with Synthesis Temperature," Solid State Ionics 89 (1996) 305–312.

Whittingham, "The Role of Ternary Phases in Cathode Reactions," J. Electrochem. Soc., 123, 315 (1976).

Abraham, et al., "Lithiated Manganese Oxide Cathodes for Rechargeable Lithium Batteries", IEEE, (1996), pp. 317–323.

Bach, et al., Sol–Gel Synthesis of Manganese Oxides, Journal of Solid State Chemistry, 88, pp. 325–333, (1990).

Bach, et al., "Synthesis and Characterization of Lamellar $MnO_2$ Obtained from Thermal Decomposition of $NaMnO_4$ for Rechargeable Lithium Cells", Journal of Solid State Chemistry, 120, pp. 70–73 (1995).

Furukawa, et al., "Manganese Oxides for Lithium Secondary Battery", Proc. Electrochem. Soc., 88–6, pp. 557–564, (1988).

Gummow et al., "Improved Capacity Retention in Rechargeable 4V Lithium/Lithium–Manganese Oxide (Spinel) Cells," Solid State Ionics, 69, 59–67 (1994).

Kelder, et al., Bulk Syntheses and Electrochemical Properties of Submicron Powders of $Li_xMn_2O_4$, pp. 114–117.

Li, et al., "Secondary Li Cells", Solid State Ionics 47 (1991), pp. 231–240.

Li, et al., "Lithium Intercalation from Aqueous Solutions", J. Electrochem. Soc., vol. 141, No. 9, Sep. 1994, pp. 2310–2316.

Manev, et al., "Synthesis of $LiMn_2O_4$ for Rechargeable Lithium–Ion Battery", Log Batteries, Battery Mater., vol. 14, (1995), pp. 101–124.

Momchilov, et al., "Rechargeable Lithium Battery with Spinel–Related $MnO_2$", Journal of Power Sources, 41 (1993) pp. 305–314.

Nohma, et al., "Li/$MnO_2$ (CDMO) Rechargeable Batteries", Proc. Electrochem. Soc., 91–3, pp. 311–317 (1991).

Nohma, et al., "Commercial Cells Based on $MnO_2$ and $MnO_2$Related Cathodes", Chapter 11, Ind. Chem. Libr., 5(Lithium Batteries) pp. 417–456, (1994).

Pereira–Ramos, J.P., "Electrochemical Properties of Cathodic Materials Synthesized by Low–Temperature Techniques", Journal of Power Sources, 54 (1995) pp. 120–126.

Pistoia, et al., "Synthesis of Mn Spinels from Different Polymorphs of $MnO_2$", Journal of Power Sources, 56 (1995) pp. 37–43.

Rossouw, et al., "Alpha Manganese Dioxide for Lithium Batteries: A Structural and Electrochemical Study", Matt. Res. Bull., vol. 27, pp. 221–230, (1992).

Tarascon, et al., "Synthesis Conditions and Oxygen Stoichiometry Effects on Li Insertion into the Spinel $LiMn_2O_4$", J. Electrochem. Soc., vol. 141, No. 6, Jun., 1994, pp. 1421–1431.

Thackeray, M.M., "Developments in Li–Mn–O Electrode Technology for Rechargeable Lithium Batteries", Progress in Batteries & Battery Materials, vol. 11 (1992) IBA Sydney (Australia) Meeting, pp. 150–157.

Thackeray, et al., "Ramsdellite–$MnO_2$ for Lithium Batteries: The Ramsdellite to Spinel Transformation", Electrochimica Acta, vol. 38, No. 9, pp. 1259–1267, (1993).

Zachau–Christiansen, et al., "Insertion of Lithium into the Manganese Dioxides: Pyrolusite and Ramsdellite", Solid State Ionics 70/71 (1994) pp. 401–406.

* cited by examiner

LITHIATED MANGANESE OXIDE

This is a continuation-in-part, of prior U.S. application Ser. No. 09/082,329, filed May 21, 1998, U.S. Pat. No. 5,955,052, issued Sep. 21, 1999 which is hereby incorporated herein by reference in its entirety.

FIELD OF THE INVENTION

This invention relates to a method of making lithiated manganese oxide which is particularly useful in the manufacture of lithium/manganese batteries or other applications involving lithium intercalation or deintercalation. More particularly, this invention is directed to making $LiMn_2O_4$ from a manganese dioxide which has sodium and/or potassium ions, exchanging the sodium and/or potassium ions for lithium ions in an ion exchange reaction and where the $LiMn_2O_4$ has an x-ray pattern recognized as particularly useful in the manufacture of batteries.

BACKGROUND OF THE INVENTION

Manganese dioxide is a known material for use as a cathodic material in batteries. It also is known that it is not particularly suitable for rechargeable batteries. Apparently irreversible structural changes occur in manganese dioxide during discharge which do not permit recharging.

Lithiated manganese oxide made from manganese dioxide ($MnO_2$) has been investigated for use in rechargeable batteries. The method of making the lithiated manganese oxide and the manganese dioxide starting material appears to materially affect the effectiveness of the lithiated manganese oxide used in rechargeable batteries. U.S. Pat. Nos. 4,312,930 and 4,246,253 to Hunter describe a lithiated manganese oxide which Hunter says has a particularly effective utility for rechargeable batteries. Each of these Hunter patents is incorporated herein as if fully rewritten.

Making lithiated manganese compounds is not necessarily new. Monchilov and Manev describe making lithiated manganese compounds (see Journal of Power Sources, 41 (1993) 305–314 and Log Batteries, Battery Mater., Vol. 14 (1995), respectively), but do not describe making such compounds from relatively impure compounds which have a high sodium and/or potassium content and making relatively pure lithiated manganese compounds by removing the sodium and/or potassium and replacing those alkali metals with lithium to make a pure lithiated manganese compound.

U.S. Pat. No. 5,759,510 to Pillai and copending application Serial No. PCT/US97/17081, filed Sep. 30, 1997, (which is a continuation-in-part application from the application which matured into U.S. Pat. No. 5,759,510) describe making lithiated manganese oxide from manganese dioxide. When compared to the process described herein, the process described in these copending applications are more complex, require higher temperatures, do not use an ion exchange reaction, and hence require more severe conditions in making an initially calcined product which is thereafter calcined. As a result these processes are more likely to generate more impurities and are more energy intensive.

An object of this invention is to provide a process for making lithiated manganese oxide.

Another object of this invention is to use chemically made manganese dioxide having sodium and/or potassium ions in making the lithiated manganese oxide by the process of the invention.

Yet another object of this invention is to make a pure form of lithiated manganese oxide from the reduction of a sodium and/or potassium permanganate or manganate and controlling the ratio of sodium and/or potassium ions in the amorphous manganese oxide which results from the reduction of the permanganate or manganate such that the lithiated manganese oxide has a utility that is particularly effective for a cathodic material for rechargeable batteries.

Yet another object of the invention is to make a lithiated manganese oxide by a process which has few steps, has a low manganese and lithium loss and is energy efficient.

Further objects and advantages of the invention will be found by reference to the following specification.

As used herein, $LiMn_2O_4$ means a lithiated manganese oxide with the general formula $Li_{1+x}Mn_{2-y}O_4$ where x is greater than about $-0.11$ and less than about $+0.33$, and y is equal to about 0 to about 0.33.

As used herein, "amorphous manganese dioxide" means a manganese dioxide which does not have a substantially identifiable crystal structure as determined by x-ray diffractometry.

As used herein, "delta manganese dioxide" means a manganese dioxide which does not have a single crystal structure which dominates to provide a manganese dioxide with at least one identifiable crystal structure. Delta manganese dioxide is often described as having the following general formula $M_2O \cdot 4MnO_2$ where M is an alkali metal cation.

As used herein, "reducing permanganate" means taking the oxidation state of manganese (VII) to manganese (III or IV).

As used herein, "substantially all Mn IV" means at least about 90 weight percent Mn IV and not more than about 10 weight percent Mn III.

As used herein, "defect spinel" is all material within the general formula $Li_{1+x}Mn_{2-y}O_4$ where x is greater than about $-0.11$ and less than about $+0.33$ and y is about 0 to about 33, but not $LiMn_2O_4$ (where x & y are 0). A specific defect spinel which has utility is where the Li to Mn ion molar ratio is about 0.5.

Another type of defect spinel which has utility is a stoichiometric spinel where the oxidation state of the manganese varies from about 3.5 to 4.0. In the former example of a defect spinel, the Li to Mn ion molar ratio is controlled by how much sodium and/or potassium ions are in the $MnO_2$ and pH control of the reaction (through the use of LiOH) to get the spinel. To raise the Li to Mn ratio to about 0.6, the pH should be raised. The nature of stoichiometric spinel may be controlled by reaction temperature. Increase the reaction temperature to get the spinel and decrease the oxidation state of the Mn.

SUMMARY OF THE INVENTION

The process of the invention provides a high purity $LiMn_2O_4$ from chemically made amorphous $MnO_2$ that has sodium and potassium impurities therein. The amount of lithium in the resulting lithiated manganese oxide is controlled through the ratio of sodium and/or potassium ions in the amorphous manganese dioxide. This is because the sodium and/or potassium ions ultimately are exchanged or replaced with lithium ions via an ion exchange reaction. It is these lithium ions in the lithiated manganese oxide which provide the lithiated manganese oxide an especially effective utility for use as a cathodic material in rechargeable batteries. The invention is particularly useful and nonobvious because (1) it utilizes as a starting material a relatively inexpensive chemically made manganese dioxide with alkali metal impurities in it, (2) removes the unwanted alkali metals, such as sodium and potassium, with less manganese loss than previously known processes, (3) replaces the sodium and/or potassium with lithium in less steps than previously known processes, (4) lowers or mitigates lithium loss relative to previously known processes, (5) lowers energy consumption relative to previously known processes to make a pure spinel $LiMn_2O_4$ material because the method of the invention permits lower temperatures in making an ion replaced product which when calcined provides the lithiated manganese oxide, (6) lowers the amount of impurities from manganese because by running an ion exchange reaction at relatively low temperatures, manganese impurities generated by high temperatures or harsh conditions to replace sodium and/or potassium ions with lithium ions are not created, (7) exhibits higher degrees of control over the physical properties of the material than previously known processes, and (8) provides a method of preparing a series of defect and stoichiometric spinels. It is the spinel material which is especially useful for batteries. Moreover, the invention has the ability to remove sodium and/or potassium to an amount of at least not more than about 0.001 moles of sodium and potassium together, per mole of manganese, in the lithiated manganese compound (not more than about 0.001 moles of sodium and potassium, per mole of manganese, are left in the lithiated manganese compound).

The process of the invention utilizes amorphous manganese dioxide which has a ratio of sodium and/or potassium ions to manganese in the manganese dioxide in the range of from about 0.40 to about 0.8, and in an important aspect, the ratio of sodium and/or potassium ions to manganese is from about 0.45 to about 0.55. This ratio sets the amount of lithium ions which can be inserted into the manganese dioxide via an ion exchange reaction which exchanges the sodium and/or potassium alkali metals with lithium ions. In an important aspect, the amorphous manganese dioxide is made from the reduction of sodium and/or potassium permanganate and/or manganate to obtain a lithium compound blend. In a very important aspect the starting material for the amorphous manganese dioxide is sodium and/or potassium permanganate.

In the method of the invention, the manganese dioxide described above is blended with a lithium compound to provide a lithium compound blend. An ion exchange reaction is initiated in the blend. The ion exchange reaction is run at a temperature of from about 5° C. to about 400° C. and exchanges the sodium and/or potassium ions in the manganese dioxide with lithium ions from the lithium compound to provide an ion replaced product. The lithium compound blend has more lithium ions from the lithium compound than sodium and/or potassium alkali metal ions and is run for a time sufficient such that after the exchange, a resulting ion replaced product has from about 0.40 to about 0.8 moles Li per mole Mn, and in an important aspect, has from about 0.45 to about 0.55 moles of Li per mole of Mn. In an another important aspect, the first ion exchange reaction is run at a temperature range of from about 240° F. to about 250° F. with subsequent exchanges to attain the aforedescribed Li to Mn ratio being conducted at about about room temperature (e.g., 25° C.).

The ion exchange reaction is conducted in a liquid media. The liquid media may be a melt by melting the lithium compound, or may be an organic or aqueous solvent. In an important aspect, the liquid media is an aqueous solvent. The ion exchange reaction may be repeated as often as necessary (where an intermediate ion exchanged product undergoes an additional ion exchange reaction) to reach the desired Li:Mn ratio. In another aspect, the lithium compound is in a stoichiometric excess which is effective for replacing sodium and/or potassium such that the ion replaced product has not more than about 0.1 moles of Na and/or K in the ion replaced product and in an important aspect, not more than about 0.01 moles of Na and/or K in the ion replaced product. In a very important aspect, the excess lithium compound is such that the ion replaced product formed has not more than about 0.001 moles sodium and/or potassium per mole manganese. In general, the stoichiometry of lithium compound in the lithium compound blend is at least about 1 equivalent mole of lithium for every mole of manganese dioxide.

The ion replaced product having the ratio of at least about 0.40 is separated from the sodium and/or alkali metal ions which have been removed from the amorphous manganese dioxide in the blend. This is done by filtration, decanting, centrifugation and washing.

The ion replaced product from the ion exchange reaction is heated at a temperature of from about 500° C. to about 900° C. for a time effective to provide a lithiated manganese oxide having the formula $Li_{1+x}Mn_{2-y}O_4$. The heating at the latter temperature range is generally from about 0.5 to about 16 hours. The process of the invention permits a spinel phase purity of at least 99.5 weight percent. Moreover, for a given calcining or heating temperature, the process of the invention produces less of the "rock salt phase" lithiated manganese oxide ($Li_2MnO_3$) and less of the $Mn_2O_3$ phase which would be produced by merely heating $MnO_2$ with a lithium compound.

The excess of lithium compound, the time and temperature of the ion exchange reaction of the blend of lithium compound and manganese dioxide, and the time and temperature of the second heating step which heats the ion replaced product, all effect the purity of the $LiMn_2O_4$ spinel and the ability of that spinel to generate an electromotive force. In an important aspect, this electromotive force is from about 2.5 to about 4.5 volts when it is used as a cathodic material in a battery containing a Li metal anode which is recyclable at least about fifty times.

In another important aspect, the lithium compound with which the manganese oxide is blended is selected from the group consisting of lithium nitrate, lithium hydroxide, lithium chloride, lithium bromide, lithium iodide, lithium sulfate, lithium perchlorate and mixtures thereof. Use of lithium nitrate is a particularly important aspect of the invention.

Finally, in yet another important aspect, the chemically reduced manganese dioxide used in the lithium compound/manganese dioxide blend is a reaction product of sodium and/or potassium permanganate with an organic reducing agent. In a particularly important aspect, the organic reducing agent has side chain lower alkyl groups (side chains having one to four carbon atoms, such as methyl, ethyl, propyl and butyl groups). Such compounds include alkyl substituted pyridines and dialkyl substituted pyridines having the general formula

where at least one of x and y are methyl, ethyl, propyl and butyl, but one x or y may be H. Other organic compounds which may be used to reduce the permanganate include fumaric acid, propanol, glucose, toluene sulphonamide, picoline. Use of an organic reducing agent permits control of the particle size of the manganese dioxide which in turn permits a precise control of the particle size of the $Li_xMn_2O_4$ spinel.

BRIEF DESCRIPTION OF THE DRAWINGS

FIG. 2 shows the discharge curves at a C/2 rate for a sample of Li-SMD calcined at 800° C. for 2 hours and quenched to room temperature.

DETAILED DESCRIPTION OF THE INVENTION

Figure 1:
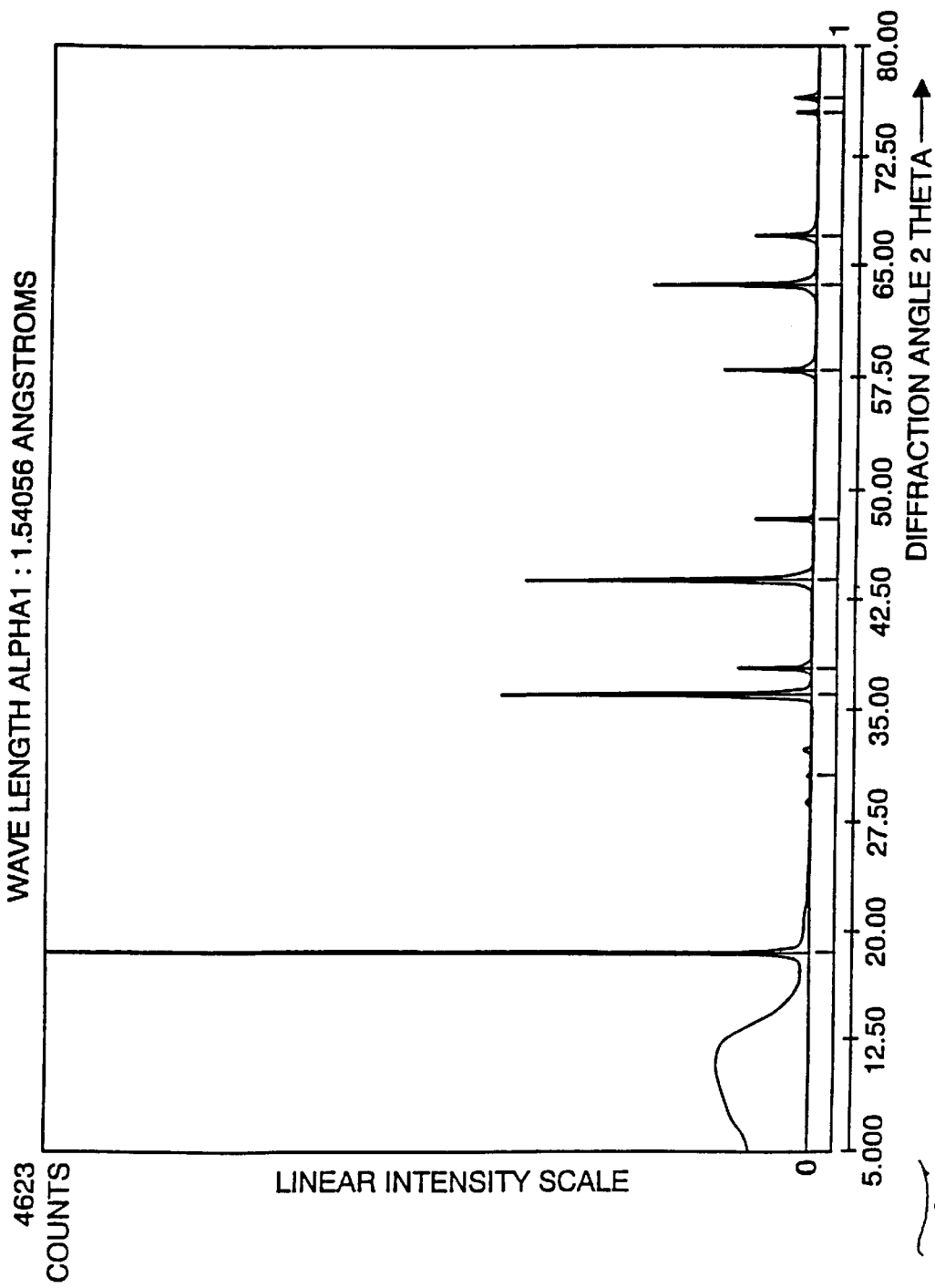
FIG. 1 is an x-ray diffraction pattern of $LiMn_2O_4$, which may be made according to the invention.
Figure 2:
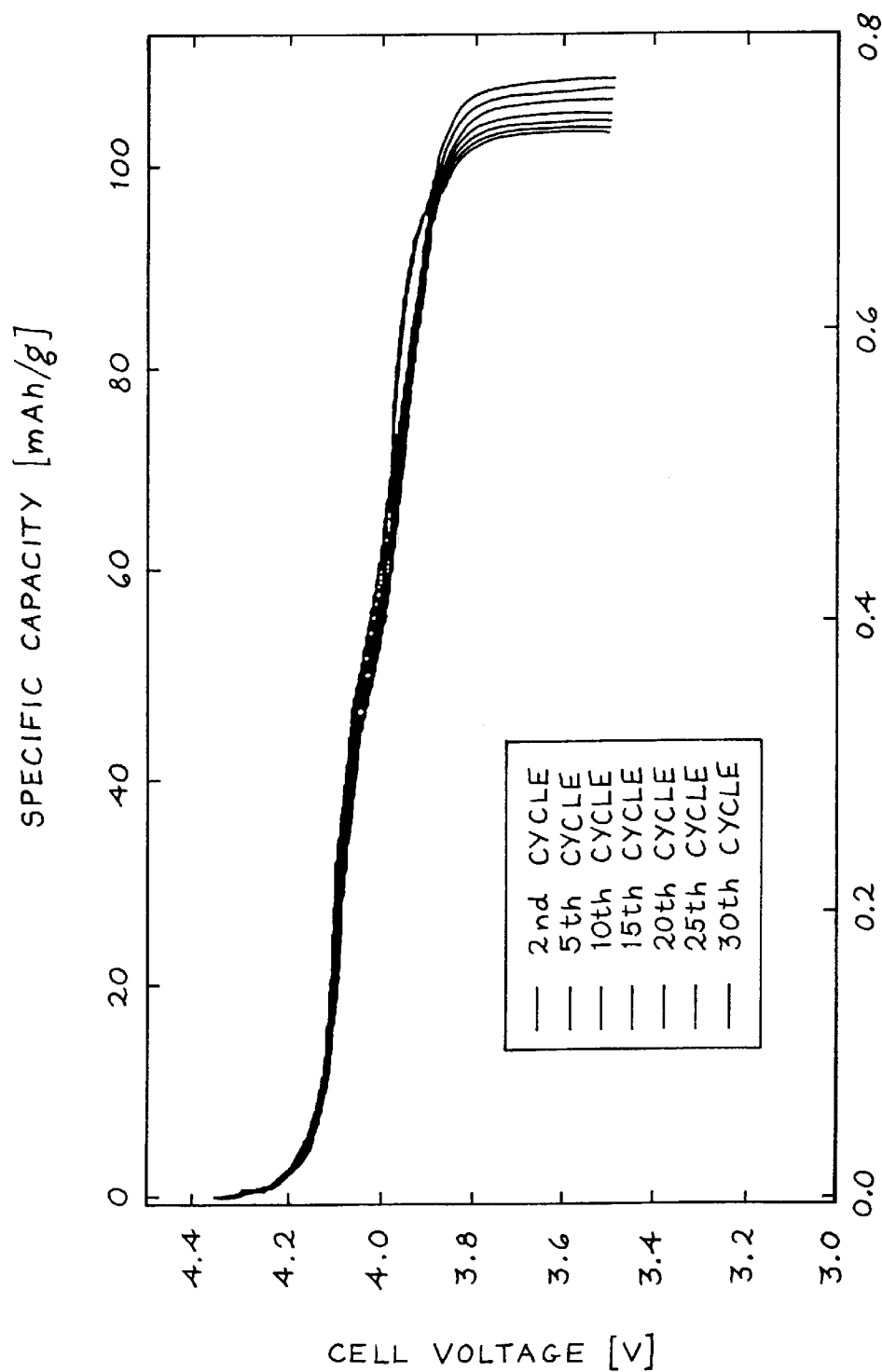
FIG. 2 shows the discharge curves at a C/2 rate for a sample of $LiMn_2O_4$, made by this process. More specifically.

The invention provides a method of making $LiMn_2O_4$ from chemically made manganese dioxide. The method of the invention provides $LiMn_2O_4$ which is particularly useful as cathodic material for rechargeable batteries. The invention permits the use of an amorphous $MnO_2$ which contains significant amounts of sodium and/or potassium ions which is a product of an oxidation/reduction reaction. In an important aspect a sodium and/or potassium permanganate or manganate salt, particularly a sodium and/or potassium permanganate, is reduced to provide the amorphous manganese dioxide during an oxidation of an organic compound by the permanganate or manganate salt. The oxidation/reduction reaction using an organic reducing agent is conducted at a pH of at least 7, but in an important aspect is conducted at a pH above about 10. The manganese dioxide that results from the oxidation/reduction reaction may be characterized as amorphous or delta manganese dioxide. This amorphous manganese dioxide has from about 0.40 to about 0.80 moles of Na and/or K per mole of Mn. The organic compound reduces permanganate or the manganate such that the resulting manganese dioxide is substantially all manganese IV (at least about 90 weight percent manganese IV). Not more than about 10 weight percent of the resulting manganese dioxide is manganese III. The pH and the type of alkali or base used in the oxidation reduction reaction which provides the manganese dioxide all affect and control the amount of sodium and/or potassium ions in the manganese dioxide.

The chemistry of the process of the invention permits the manganese used to make the lithiated manganese oxide to start as manganese (VII) or manganese (VI) as a permanganate or manganate, then the manganese goes to a manganese (IV) as a part of the amorphous manganese dioxide, and then the manganese goes to a manganese of about 3.5 after the calcination reaction. This change in valence is in a continuous way and without the necessity of a lot of energy consumption prior to the calcination reaction. Other prior art processes require more steps where the valence of the manganese is below three and the oxidation state has to be brought up to 3.5 from 3 or less.

Another aspect of the invention permits control of the particle size of the $LiMn_2O_4$ by controlling the particle size of the amorphous $MnO_2$ used to make the spinel lithiated manganese oxide ($LiMn_2O_4$). After making the amorphous $MnO_2$, the process of the invention is sufficiently gentle so as not to reduce the mean particle size of the $MnO_2$ product by more than about 20%, and in an important aspect, not more than 10% from the particle size of the $MnO_2$ used to make the $LiMn_2O_4$. The particle size of the amorphous $MnO_2$ may be controlled by controlling the rate of mixing the reactants used to make the amorphous $MnO_2$, controlling the rate of agitation of the reactants and controlling the reaction temperature to make the $MnO_2$. Increasing the rate of mixing the reactants, increasing the agitation of the reactants during the reaction and increasing the reaction temperature will reduce the particle size of the $MnO_2$.

In an important aspect, the invention controls the mean particle size of the lithiated manganese oxide to a range of from about 2 to about 35 microns through using a temperature of from about 10° C. to about 200° C., using an organic compound as a reducing agent, and $Mn^{+7}$ or $Mn^{+6}$ as the oxidizing agent to form the precursor manganese dioxide.

The organic compound which may be used in the oxidation/reduction reaction may be an organic compound having side chain lower alkyl groups (side chains having one to four carbon atoms, such as methyl, ethyl, propyl and butyl groups). Such compounds include alkyl substituted pyridines and dialkyl substituted pyridines having the general formula

where at least one of x and y are methyl, ethyl, propyl and butyl, but one x or y may be H. Other organic compounds which may be used to reduce the permanganate or manganate include fumaric acid, propanol, glucose, toluene sulphonamide, picoline and the compounds listed below in Table I. Table I illustrates the pH of the dependency of the oxidation/reduction reaction and illustrates the need for alkaline conditions when an organic reducing agent is used.

TABLE I

Organic Compounds which Reduce Aqueous Permanganate as reported in the Chemical Literature*

| COMPOUND | pH 7 | pH 10 |
| --- | --- | --- |
| Propanol | Reaction | Reaction |
| Propylamine | No reaction | Reaction |
| Ethyl formate | No reaction | Reaction |
| Alanine | No reaction | Reaction |
| Pyruvic acid | Reaction | Reaction |
| Acrolein | Reaction | Reaction |
| Allylamine | Reaction | Reaction |
| Acrylic acid | Reaction | Reaction |
| Allyl alcohol | Reaction | Reaction |
| Benzaldehyde | Reaction | Reaction |
| Phenol | Reaction | Reaction |
| Aniline | Reaction | Reaction |
| Benzyl alcohol | Reaction | Reaction |
| 2-Butanone | No reaction | Reaction |

*[Organic compound] = 50 mg/L. [$KMnO_4$] = 32 mg/L.
Consumption of 10 mg/L of $KMnO_4$ in 6 hours is an indication that a reaction had taken place.

TABLE II

By varying agitation, turbines and flow, the control of the mean particle size of MnO₂ made by reducing KMnO₃ with lutidine is illustrated below.

| Oxidant | Reductant | Alkali | Alkali % | # of turbines* | Direction of flow** | Agit.*** Rate RPM | Feed Rate, lbs/hr | Mean particle size $\mu$ of MNO$_2$ |
|---|---|---|---|---|---|---|---|---|
| KMnO4 | 2,3 Lutidine | KOH  | 13  | 2 | down | 64 | 1750 | 7.64 |
| MNnO4 | 2,3 Lutidine | NaOH | 9.1 | 2 | down | 64 | 1750 | 6.85 |
| KMnO4 | 2,3 Lutidine | NaOH | 9.1 | 2 | down | 68 | 1750 | 7.64 |
| KMnO4 | 2,3 Lutidine | NaOH | 9.1 | 2 | down | 64 | 1800 | 5.27 |
| KMnO4 | 2,3 Lutidine | NaOH | 9.1 | 2 | up   | 64 | 1800 | 16.5 |
| KMnO4 | 2,3 Lutidine | KOH  | 13  | 3 | down | 72 | 2500 | 16.5 |

*blades for mixing
**flow of mixing of ingredients
***Agitation Rate RPM

In another aspect an inorganic reducing agent may be used. By way of example, when manganese nitrate is used as the reducing agent, acid or alkaline conditions may be used.

To make the lithiated manganese dioxide, the manganese dioxide from the oxidation/reduction reaction is blended with an excess of lithium compound such as lithium nitrate, lithium hydroxide, lithium chloride, lithium bromide, lithium iodide, lithium perchlorate and lithium sulfate, to provide a lithium compound/manganese dioxide blend. Use of lithium nitrate is a particularly important aspect of the invention. The lithium in the lithium compound is in stoichiometric excess of the manganese in the manganese dioxide, such that there is more than about 1 equivalent mole lithium for every mole of manganese dioxide. The excess of lithium compound should be sufficient to replace potassium and/or sodium in the manganese dioxide which excess also is effective for providing the resulting lithiated manganese oxide with the ability to provide at least about 2.5 volts, and in an important aspect about 4 to 4.5 volts, of electromotive force with respect to a Li metal anode when the lithiated manganese oxide spinel is used as a cathode material in a rechargeable battery which is recyclable at least about fifty times. The resulting lithiated manganese dioxide or ion replaced product should have a lithium to manganese ratio of at least 0.40, and preferably from about 0.45 to about 0.55 moles of Li per mole of Mn. In an important aspect, the cathode material permits recyclable recharging at least 300 times. In an important aspect, the ion replaced product also should not have more than about 0.001 mole sodium and/or potassium per mole Mn. More than about 3 mole equivalents of lithium could be used, but to keep the process economic, recycling or some other method of conserving the lithium probably would have to be used.

An excess of the lithium compound and lithium ions over the amount of sodium and/or potassium ions in the lithium compound blend creates a concentration gradient which is sufficient to drive the reaction which replaces the sodium and/or potassium ions with lithium ions such that the ion replaced product has at least about 0.45 moles Li per mole Mn or the ion replaced product has not more than about 0.001 mole sodium and/or potassium per mole Mn after the reaction of the lithium compound with the manganese dioxide and then optionally repeating the reaction using an intermediate ion replaced product reactant to obtain a final ion replaced product with the desired lithium ion content and lowered sodium and potassium content.

The ion exchange reaction which exchanges the sodium and/or potassium ions in the manganese dioxide with lithium ions from the lithium compound may be done in a liquid media as a melt or in a system which uses water as a solvent or an organic solvent. When done as a melt, the manganese dioxide and lithium compound are blended, and the blend is heated at least at the melting point of the lithium compound (such as about 264° C. for lithium nitrate) to make the melt. Thereafter, the heated manganese dioxide/melt blend reaction product is cooled and then is washed with a solvent, such as water or water and organic solvent blend to dissolve and remove excess lithium compound and to remove the sodium and/or potassium ions which have been removed or exchanged from the manganese dioxide. Thereafter, the solvent used as a wash is filtered from the solid ion replaced product.

The wash solvent with excess lithium is separated from the ion replaced product. The solvent then is evaporated to recover the excess lithium compound. As previously described, the reaction to obtain the ion replaced product may be optionally repeated (a number of "exchanges") using an intermediate ion replaced product or a blend of manganese dioxide and ion replaced product to react with the lithium compound until the desired level of lithium is obtained in the final ion replaced product. Washing may be effected with deionized water with the product. For about every pound of solid ion replaced product about one pound of water is used to wash the ion replaced product In an important aspect, the ion replaced product is made using a solvent as the liquid media. In a very important aspect, the solvent is water. When the liquid media includes a solvent, the manganese dioxide and lithium compound may be dispersed or dissolved in a solvent, such as water and/or and organic solvent such as acetonitrile, chloroform, ethanol or acetone, and the solvent/reactant blend may thereafter be heated for a time and temperature to effect the replacement of sodium and/or potassium with lithium as described above. The ratio of lithium compound and manganese dioxide, the lithium compound which is used, the type of solvent (if any) which is used, the time and temperature of the heating of the lithium compound/manganese dioxide blend and the number of exchange reactions are all conditions which affect the amount of potassium and sodium ions which are replaced by lithium ions. A particularly effective solvent system in the invention is the use of an aqueous dispersion with a MnO$_2$/lithium compound ratio of 1:2 with about 4 exchanges, or a MnO$_2$/lithium compound ratio of about 1:3 with about 3 exchanges at about 25° C. Various reactants and their effectiveness are shown in Table III shown below. Reference to Table below indicates that lithium nitrate (LiNO$_3$) is very effective for replacing sodium and potassium ions with lithium ions. Multiple ion exchanges are more effective than single step reactions.

TABLE III

Ion Exchange Reactions Of Lithium Compounds With $MnO_2$

| Li-Salt | Solvent | $MnO_2$:Li Salt Ratio (by weight) | Number of Exchanges | % of K replaced by Li |
|---|---|---|---|---|
| $LiNO_3$-melt |  | 1:4 | 1 | 97.0 |
| $LiNO_3$-melt |  | 1:2 | 2 | 94.6 |
| $LiNO_3$-melt |  | 1:2 | 2 | 99.3 |
| $LiNO_3$-melt |  | 1:2 | 3 | 99.4 |
| $LiNO_3$ | Water | 1:20 | 1 | 84.7 |
| LiBr | Acetonitrile | 1:4 | 1 | 15.4 |
| LiBr | Acetonitrile | 1:4 | 2 | 59.8 |
| LiBr | Water | 1:4 | 1 | 61.6 |
| LiBr | Water | 1:4 | 2 | 71.6 |
| LiCl | Acetonitrile | 1:4 | 1 | 65.3 |
| LiCl | Acetonitrile | 1:4 | 2 | 86.3 |
| LiCl | Water | 1:4 | 1 | 81.1 |
| LiCl | Water | 1:4 | 2 | 92.1 |
| $Li_2SO_4$ | Water | 1:4 | 1 | 71.2 |
| $Li_2SO_4$ | Water | 1:4 | 2 | 87.7 |
| LiOH | Water | 1:10 | 1 | 83.0 |
| LiOH | Water | 1:10 | 2 | 96.2 |

The washed final ion exchanged product which is from the reaction of the manganese dioxide and lithium compound and which has been separated from excess lithium and the sodium and/or potassium ions removed from the manganese dioxide, then is heated or calcined at from about 300° C. to about 900° C. for about 0.5 to about 16 hours. The temperature of the calcination of the final ion replaced product has an affect on the particle size, surface area and the lattice parameter of the manganese oxide spinel product. In general, however, the process of the invention is gentle and the mean particle size of the $LiMn_2O_4$ can be controlled through the control of the particle size of the amorphous $MnO_2$ being used in the process. This is illustrated in Table IV.

TABLE IV

Comparison of the control of particle size of $LiMn_2O_4$ prepared by the process of the invention and the process of copendency application Ser. No. 08/726,323 (LiOH). In using the LiOH process, the average particle size is 9.8$\mu$ with a standard deviation of 1.8$\mu$. (Size is reduced by about 30%). In the process of the invention under varying conditions, but using the process of the invention, the average is 12.5$\mu$ with a standard deviation of 0.7$\mu$. (Size is reduced by about 10% in these examples).

| No. | Process Route | Mean Particle size of SMD, $\mu$ | Mean Particle size of spinel, $\mu$ | |
|---|---|---|---|---|
| 1 | LiOH | 4.8 | 2.6 | |
| 2 | LiOH | 14.3 | 10.1 | |
| 3 | LiOH | 14.3 | 9.5 | 2 to 9 |
| 4 | LiOH | 14.3 | 12.5 | |
| 5 | LiOH | 14.3 | 8 | Mean |
| 6 | LiOH | 14.3 | 8 | 9.78 |
| 7 | LiOH | 14 | 8.1 | S.D. |
| 8 | LiOH | 14 | 12.25 | 1.81 |
| 9 | LiOH | 14 | 9.8 | |
| 10 | Invention | 14 | 12 | 10 to 15 |
| 11 | Invention | 14 | 13.3 | |
| 12 | Invention | 14 | 13.3 | Mean |
| 13 | Invention | 14 | 12.2 | 12.52 |
| 14 | Invention | 14 | 12.8 | S.D. |
| 15 | Invention | 14 | 11.5 | 0.74 |

The calcining temperature of the final ion exchanged product to produce the manganese oxide spinel also affects the type of defect spinel produced by the process and the discharge characteristics of the spinel. As noted above, an increase in temperature will decrease the oxidation state of the Mn in the spinel.

The specific capacity and the fade in capacity of the spinel is affected as to how fast the product is cooled after calcining. The specific capacity of the samples slow cooled fades faster than that of the samples rapidly cooled to room temperature. In the invention, better capacity is obtained by cooling the product to almost room temperature in less than 2 hours, and in an important aspect, less than about ½ hour. Alternatively, slower cooling can be done in a controlled-free environment; wherein there is not sufficient $O_2$ in the cooling environment to substantially affect capacity.

What is claimed is:

1. A method for making lithiated manganese oxide, the method comprising:

blending a lithium compound and chemically made amorphous $MnO_2$ which includes alkali metal ions selected from the group consisting of sodium ions, potassium ions and mixtures thereof to obtain a lithium compound blend, the ratio of said alkali metal ions to manganese in the amorphous manganese dioxide being from about 0.4 to about 0.8;

ion exchanging said alkali metal ions for lithium ions in the $MnO_2$ which is in the lithium compound blend at a temperature of from about 5° C. to about 400° C. to obtain an ion replaced product, the lithium compound blend having more lithium ions from the lithium compound than said alkali metal ions such that after the exchange, the ion replaced product has at least about 0.4 moles Li per mole Mn;

separating the ion exchanged product from said alkali metal ions which have been removed from the amorphous manganese dioxide; and heating the ion replaced product at a temperature of of from about 300° C. to about 900° C. for a time effective to provide a lithiated manganese oxide spinel having the formula $Li_{1+x}Mn_{2-y}O_4$ where x is greater than about −0.11 and less than about +0.33, and y is from about 0 to about 0.33.

2. A method as recited in claim 1 wherein the ion replaced product is heated at about 300° C. to about 900° C. for about 0.5 hours to about 16 hours.

3. A method as recited in claims 1 or 2 wherein the stoichiometric excess of lithium compound in the blend is greater than about 1.

4. A method as recited in claim 1 wherein the lithium compound is selected from the group consisting of lithium, hydroxide, lithium nitrate, lithium chloride, lithium bromide, lithium iodide, lithium sulfate, lithium perchlorate and mixtures thereof.

5. A method as recited in claim 1 wherein the lithiated manganese oxide is effective for providing an electromotive force of from about 2.5 to about 4.5 volts when it is used as a cathodic material in a battery employing a lithium metal anode which is recyclable at least about fifty times.

6. A method as recited in claim 5 wherein ion exchanging said alkali metal ions in the amorphous $MnO_2$ in the lithium compound blend provides an intermediate ion replaced product and the method further comprises separating the intermediate ion exchanged product from said alkali metal ions which have been removed from the amorphous manganese dioxide, and blending and exchanging said alkali metal ions in the $MnO_2$ in the intermediate ion replaced product with lithium ions from the lithium compound to provide a final ion replaced product which does not have more than about 0.001 moles of said alkali metal ions per mole Mn after repeating the blending and exchanging of the intermediate ion replaced product, the final ion replaced product being heated at a temperature of from about 300° C. to about 900° C. to provide the $Li_{1+x}Mn_{2-y}O_4$.

7. A method as recited in claims 5 or 6 wherein the lithium compound is lithium nitrate.

8. A method as recited in claim 1, wherein the ion exchanging is done in a liquid media and the liquid media is a melt of the lithium compound.

9. A method as recited in claim 1, wherein the ion exchanging is done in a liquid media and the liquid media comprises water and the ion exchange is done with a slurry which comprises the lithium compound and the amorphous manganese dioxide.

10. A method as recited in claim 1, wherein the ion exchanging is done in a liquid media and the liquid media comprises an organic solvent.

11. A method for making lithiated manganese oxide, the method comprising:

blending a lithium compound and amorphous $MnO_2$ made by chemically reducing an alkali metal manganese compound selected from the group consisting of potassium permanganate, sodium permanganate, potassium manganate, sodium manganate and mixtures thereof to obtain a lithium compound blend, the ratio of said alkali metal ions to manganese being from about 0.4 to about 0.8;

ion exchanging alkali metal ions selected from the group consisting of sodium ions, potassium ions and mixtures thereof in the amorphous $MnO_2$ for lithium ions from the lithium compound in the blend at a temperature of from about 5° C. to about 400° C., the blend having more lithium ions from the lithium compound than said alkali metal ions such that after the exchange, a final ion replaced product is obtained which does not have more than about 0.001 mole of said alkali metal ions per mole Mn;

separating the ion exchanged product from said alkali metal ions which have been removed from the amorphous manganese dioxide; and heating the final ion replaced product at a temperature of from about 300° C. to about 900° C. for a time effective to provide a lithiated manganese oxide having the formula $Li_{1+x}Mn_{2-y}O_4$ where x is greater than about −0.11 and less than about +0.33, and y from about 0 to about 0.33.

12. A method as recited in claim 11 wherein ion exchanging said alkali metal ions in the amorphous $MnO_2$ in the lithium compound blend provides an intermediate ion replaced product and the method further comprises separating the intermediate ion exchanged product from said alkali metal ions which have been removed from the amorphous manganese dioxide, and blending and exchanging said alkali metal ions in the $MnO_2$ in the intermediate ion replaced product with the lithium compound to provide the final ion replaced product which does not have more than about 0.001 moles of said alkali metal ions per mole Mn after repeating the blending and exchanging of the intermediate ion replaced product.

13. A method as recited in claims 11 or 12 wherein the stoichiometric excess of lithium compound in the blend is greater than about 1.

14. A method as recited in claims 11 or 12 wherein the lithium compound is selected from the group consisting of lithium hydroxide, lithium nitrate, lithium chloride, lithium bromide, lithium iodide, lithium sulfate, lithium perchlorate and mixtures thereof.

15. A method as recited in claims 11 or 12 wherein the lithium manganese oxide is effective for providing an electromotive force of from about 2.5 to about 4.5 volts when it is used as a cathodic material in a battery employing a Li metal anode which is recyclable at least about fifty times.

16. A method as recited in claims 11 or 12 wherein the lithium compound is lithium nitrate.

17. A method as recited in claims 5, 11 or 12 wherein the final ion replaced product is heated at about 300° C. to about 900° C. for about 0.5 hours to about 16 hours.

18. A method as recited in claim 17 wherein the final ion replaced product is heated at about 300° C. to about 900° C. for about 0.5 hours to about 16 hours.

19. A method as recited in claim 17 wherein the alkali metal manganese compound is selected from the group consisting of potassium permanganate, sodium permanganate and mixtures thereof.

20. A method as recited in claim 11, wherein the ion exchanging is done in a liquid media and the liquid media is a melt of the lithium compound.

21. A method as recited in claim 11, wherein the ion exchanging is done in a liquid media and the liquid media comprises water and the ion exchange is done with a slurry which comprises the lithium compound and the amorphous manganese dioxide.

22. A method as recited in claim 11, wherein the ion exchanging is done in a liquid media and the liquid media comprises an organic solvent.

23. A method for making lithiated manganese oxide, the method comprising:

blending a lithium compound and amorphous $MnO_2$ made by chemically reducing an alkali metal manganese compound selected from the group consisting of potassium permanganate, sodium permanganate, potassium manganate, sodium manganate and mixtures thereof to obtain a lithium compound blend, the ratio of said alkali metal ions to manganese in the amorphous manganese dioxide being from about 0.45 to about 0.55, said alkali metal ions being selected from the group consisting of sodium, potassium and mixtures thereof;

exchanging said alkali metal ions for lithium ions in the amorphous $MnO_2$ which is in the lithium compound blend at a temperature of from about 5° C. to about 400° C. to obtain an ion replaced product, the lithium compound blend having more lithium ions from the lithium compound than said alkali metal ions such that after the exchange the ion replaced product has at least about 0.45 moles Li per mole Mn;

separating the ion replaced product from said alkali metal ions which have been removed from the amorphous manganese dioxide; and heating the ion replaced product, the heating of the lithium compound blend for a time and temperature, the lithium compound being in excess of the chemically reduced alkali metal manganese compound and the heating of the ion replaced product for a time and temperature which are effective for providing a lithiated manganese oxide having the formula $Li_{1+x}Mn_{2-y}O_4$ where x is greater than about −0.11 and less than about +0.33, and y is from about 0 to about 0.33 and wherein the lithiated manganese oxide product is effective for providing an electromotive force of from about 3 to about 4 volts when it is used as a cathodic material in a battery employing a Li metal anode which is recyclable at least about fifty times.

24. A method as recited in claim 23 wherein the ion replaced product is heated at about 300° C. to about 900° C. for about 0.5 hours to about 16 hours.

25. A method as recited in claim 23 wherein alkali metal manganese compound is selected from the group consisting of potassium permanganate, sodium permanganate and mixtures thereof.

26. A method as recited in claims 23 or 25 wherein the lithium compound is selected from the group consisting of lithium hydroxide, lithium nitrate, lithium chloride, lithium bromide, lithium iodide, lithium sulfate, lithium perchlorate and mixtures thereof.

27. A method as recited in claims 23, 24 or 25 wherein ion exchanging said alkali metal ions in the amorphous manganese dioxide in the lithium compound blend provides an intermediate ion replaced product and the method further comprises separating the intermediate ion exchanged product from said alkali metal ions which have been removed from the amorphous manganese dioxide; and blending and exchanging said alkali metal ions in the amorphous manganese dioxide in the intermediate ion replaced product with lithium ions from the lithium compound to provide a final ion replaced product, the final ion replaced product having not more than about 0.001 moles of said alkali metal ions per mole Mn after repeating the blending and exchanging of the intermediate ion replaced product, the final ion replaced product being heated at a temperature of from about 300° C. to about 900° C. to provide the $Li_{1+x}Mn_{2-y}O_4$.

28. A method as recited in claim 27 wherein the ion exchange which provides the intermediate ion exchanged product is done at a temperature in the range of from about 240° F. to about 250° F. and one or more subsequent exchanges are done at about room temperature.

29. A method as recited in claim 27 wherein the lithium compound is lithium nitrate.

30. A method as recited in claim 23, wherein the ion exchanging is done in a liquid media and the liquid media is a melt of the amorphous manganese dioxide and the lithium compound.

31. A method as recited in claim 23, wherein the ion exchanging is done in a liquid media and the liquid media is comprises water and the ion exchange is done with a slurry which comprises the lithium compound and the amorphous manganese dioxide.

32. A method as recited in claim 23, wherein the ion exchanging is done in a liquid media and the liquid media comprises an organic solvent.

33. A method for making lithiated manganese oxide, the method comprising:

blending a lithium compound and chemically made amorphous $MnO_2$ which includes alkali metal ions selected from the group consisting of sodium ions, potassium ions and mixtures thereof to provide a lithium compound blend, the ratio of said alkali metal ions to manganese in the amorphous $MnO_2$ being from about 0.4 to about 0.8, to obtain a lithium compound blend, the amorphous manganese dioxide made by chemically reducing an alkali metal manganese compound with an organic reducing compound which includes side chains having from about one to about four carbon atoms, the lithium compound blend having more lithium ions from the lithium compound than said alkali metal ions such that after an exchange of the alkali metal ions for lithium ions in the $MnO_2$, the ion replaced product has at least about 0.40 mole Li ions per mole Mn;

ion exchanging said alkali metal ions in the amorphous $MnO_2$ for lithium ions in the lithium compound blend in a liquid media to obtain an ion replaced product;

separating the ion replaced product from said alkali metal ions which have been removed from the amorphous manganese dioxide; and heating the ion replaced product at a temperature of from about 300° C. to about 900° C. for a time effective to provide a lithiated manganese oxide having the formula $Li_{1+x}Mn_{2-y}O_4$ where x is greater than about −0.11 and less than about +0.33, and y is from about 0 to about 0.33, the time and temperature of the heating being effective so as to produce a mean particle size of the lithiated manganese oxide of from about 2 to about 25 microns and not less than about 80 percent of the particle size of the amorphous $MnO_2$.

34. A method as recited in claim 33 wherein ion exchanging said alkali metal ions in the amorphous manganese dioxide in the lithium compound blend provides an intermediate ion replaced product and the method further comprises separating the intermediate ion replaced product from said alkali metal ions which have been removed from the amorphous manganese dioxide and blending and exchanging said alkali metal ions in the manganese dioxide in the intermediate ion replaced product with the lithium compound to provide a final ion replaced product which does not have more than about 0.001 moles of said alkali metal ions per mole Mn after repeating the blending and exchanging of the intermediate ion replaced product.

35. A method as recited in claim 33 wherein a solvent is blended with the manganese dioxide and lithium compound to provide the liquid media in which said alkali metal ions selected from the group consisting of sodium and potassium ions in the manganese dioxide are exchanged for lithium ions.

36. A method as recited in claim 35 wherein the solvent is water.

37. A method as recited in claim 35 wherein ion exchanging said alkali metal ions in the amorphous manganese dioxide in the lithium compound blend provides an intermediate ion replaced product and the method further comprises separating the intermediate ion exchange product from said alkali metal ions which have been removed from the amorphous manganese dioxide, and blending and exchanging said alkali metal ions in the MnO$_2$ in the intermediate ion replaced product with the lithium compound to provide a final ion replaced product which does not have more than about 0.001 moles of said alkali metal ions per mole Mn after repeating the blending and exchanging of the intermediate ion replaced product.

38. A method as recited in claims 33 or 34 wherein the liquid media is a melt.

39. A method as recited in claims 33 or 34 wherein the liquid media comprises water and the lithium compound blend is heated as a slurry.

40. A method as recited in claims 33 or 34 wherein the lithiated manganese oxide has a phase purity of at least about 99.5 weight percent.

41. A method as recited in claim 40 wherein the alkali metal manganese compound is selected from the group consisting of sodium permanganate, potassium permanganate and mixtures thereof.

42. A method as recited in claims 33 or 34 wherein the lithium compound is selected from the group consisting of lithium hydroxide, lithium nitrate, lithium chloride, lithium bromide, lithium iodide, lithium sulfate, lithium perchlorate and mixtures thereof.

43. A method as recited in claim 42 wherein the lithiated manganese oxide is effective for providing an electromotive force of from about 2.5 to about 4.5 volts when it is used as a cathodic material in a battery employing a Li metal anode which is recyclable at least about fifty times.

44. A method as recited in claim 42 wherein the lithiated manganese oxide is cooled to about room temperature in less than about 2 hours.

45. A method as recited in claims 33 or ÷wherein the lithiated manganese oxide is effective for providing an electromotive force of from about 2.5 to about 4.5 volts when it is used as a cathodic material in a battery employing a Li metal anode which is recyclable at least about fifty times.

46. A method as recited in claim 45 wherein the alkali metal manganese compound is selected from the group consisting of sodium permanganate, potassium permanganate and mixtures thereof.

47. A method as recited in claim 46 wherein the lithium compound is lithium nitrate.

48. A method as recited in claim 45 wherein the lithium compound is lithium nitrate.

49. A method as recited in claim 45, wherein the ratio of said alkali metal ions to manganese in the amorphous MnO$_2$ is from about 0.45 to about 0.55.

50. A method for making lithiated manganese oxide, the method comprising:
   blending a lithium compound and chemically made amorphous MnO$_2$ which includes alkali metal ions selected from the group consisting of sodium ions, potassium ions and mixtures thereof to obtain a lithium compound blend, the ratio of said alkali metal ions to manganese in the amorphous manganese dioxide being from about 0.4 to about 0.8;
   ion exchanging said alkali metal ions for lithium ions in the MnO$_2$ which is in the lithium compound blend at a temperature of from about 5° C. to about 400° C. to obtain an ion replaced product, the lithium compound blend in a liquid media and the blend having more lithium ions from the lithium compound than said alkali metal ions such that after the exchange, the ion replaced product has at least about 0.4 moles Li per mole Mn and not more than about 0.1 mole of said alkali metal cations per mole of Mn;
   separating the ion exchanged product from said alkali metal ions which have been removed from the amorphous manganese dioxide; and
   heating the ion replaced product at a temperature of from about 300° C. to about 900° C. for a time effective to provide a lithiated manganese oxide spinel having the formula Li$_{1+x}$Mn$_{2-y}$O$_4$ where x is greater than about −0.11 and less than about +0.33, and y is from about 0 to about 0.33 and wherein the lithiated manganese oxide is effective for providing an electromotive force of from about 2.5 to about 4.5 volts when it is used as a cathodic material in a battery employing a Li metal anode which is recyclable at least about fifty times.

51. A method as recited in claim 50, wherein the liquid media comprises water.

52. A method as recited in claim 51, wherein the ion replace product does not have more than about 0.01 mole of said alkali metal cations per mole of Mn.

53. A method as recited in claim 52, wherein the ratio of said alkali metal ions to manganese in the amorphous MnO$_2$ is from about 0.45 to about 0.55.

\* \* \* \* \*